(12) United States Patent
Lanxner et al.

(10) Patent No.: US 12,182,828 B2
(45) Date of Patent: Dec. 31, 2024

(54) ESTIMATING FOOTFALL FOR A LOCATION

(71) Applicant: Placense LTD., Tel-Aviv (IL)

(72) Inventors: Eyal Shlomo Lanxner, Modiin (IL);
Yair Hochner, Jerusalem (IL)

(73) Assignee: Placense LTD., Tel-Aviv (IL)

( * ) Notice: Subject to any disclaimer, the term of this patent is extended or adjusted under 35 U.S.C. 154(b) by 622 days.

(21) Appl. No.: 17/470,226

(22) Filed: Sep. 9, 2021

(65) Prior Publication Data

US 2022/0101348 A1 Mar. 31, 2022

(30) Foreign Application Priority Data

Sep. 29, 2020 (IL) .......................................... 277669

(51) Int. Cl.
*G06Q 30/0201* (2023.01)
*G01D 1/16* (2006.01)

(52) U.S. Cl.
CPC .......... *G06Q 30/0201* (2013.01); *G01D 1/16* (2013.01)

(58) Field of Classification Search
None
See application file for complete search history.

(56) References Cited

U.S. PATENT DOCUMENTS

| 9,760,896 B2 * | 9/2017 | Ghosh | G06Q 30/0205 |
| 2016/0253689 A1 | 9/2016 | Milton et al. | |
| 2019/0164065 A1 * | 5/2019 | Velji | G06N 5/02 |

* cited by examiner

*Primary Examiner* — Walter L Lindsay, Jr.
*Assistant Examiner* — Geoffrey T Evans
(74) *Attorney, Agent, or Firm* — Dorsey & Whitney LLP

(57) ABSTRACT

The presently disclosed subject matter includes a computerized method and system for estimating footfall for a location of one or more users. Visitation data including a plurality of visit data items is obtained. The obtained visitation data is grouped into one or more groups of visit data items. For each group, the data items in the group is assigned to one or more clusters of visits. For each visit data item, the data item is assigned to a given cluster of the clusters. Based on the one or more clusters of visits data, a footfall estimation for a location is determined, wherein the footfall estimation for the location is indicative of a number of visits of the one or more users in the location, within one or more time intervals.

18 Claims, 6 Drawing Sheets

Location 510

Location 520

Location 520

Location 510

ESTIMATING FOOTFALL FOR A LOCATION

TECHNICAL FIELD

The presently disclosed subject matter relates to a footfall estimation system, and more particularly, to a footfall estimation system for a location, based on user visitation data and methods of operating thereof.

BACKGROUND

The field of footfall estimation relates to measurement of the number of people that were present in a certain location at a given time, for example in a shopping mall or in a certain touristic park. Known systems use both manual tools, such as manually counting the number of people entering a location, and digital means, such as counting the number of mobile users that are connected to a cellular antenna at a given date and time. Estimating footfall is currently used in many fields, including security, business intelligence, marketing and more. For example, insights obtained from footfall estimation can include recommendations on an optimal location for operating a particular business, based on the footfall estimation of a location, benchmarking a certain location versus competing locations at a certain time, measuring relative impact of specific events, etc.

One of the ways to estimate footfall is by processing geospatial data to obtain the number of visits of users at a certain location and time. Location intelligence deals with such processing of mass geospatial data items received from various sources such as social data, mobile data, user data, and sensor data. Once the data is received, a visual representation of the data over a map is provided, and meaningful insights can be derived from the geospatial data, by identifying geospatial relationships and insights between the data items.

One of the data sources being used by location intelligence is a mass database including user visitation data. User visitation data includes reading of GPS signals received within a given time period, such as a day or an hour, by applications running on mobile devices operated by various users in a given area. One of GPS's main advantages is its geographical precision, which can reach the level of centimeters, as opposed to other positioning technologies (e.g. cellular triangulation) which can reach precision of a hundred meters at most. Such accuracy enables the production of intelligence and insights within a granularity level, reaching more valuable insights.

Reference is made to FIG. 1 illustrating two heat maps reflecting the distribution of GPS signals within two different locations, as known in the art. The GPS signals constitute user visitation data. The dark spots circled by solid circles represent areas in which high density of signals was identified, where areas circled by dashed circles of different width represent areas in which medium and lower densities of signals were identified. As reflected by these maps, the different locations have changing levels of density, where some have condensed spots, meaning a larger number of users visited the location in a specific area in the location, and others that are more spread out.

Yet, GPS technology faces major challenges in extracting from the mass amount of user visitation data seen in a given location and time, accurate intelligence including an accurate footfall estimation. The main reason stems from inconsistency in the representation level of the data, over different locations, at different times. The user visitation data that is received, such as the data shown in the heat maps in FIG. 1, includes records of GPS signals received within a given time period, by mobile devices operated by various users. The data records can be issued by mobile apps used by the user operating the mobile device. However, each record is not rated or marked in any manner, and is treated and processed, by known location intelligence tools, equally. However, the records may be issued by mobile apps which operate or are being operated and used by users, in an inconsistent manner. For example, usage patterns of different mobile apps vary within the different population groups. For example, social media apps may be used differently in terms of the frequency of usage, by the younger population, as opposed to older populations. While the younger population may use the social media app more frequently, resulting in a larger number of records being issued during usage of the app for the user in a given location and time, the older population may make less frequent usage of the same apps, resulting in a lesser number of records being issued for the older user during usage of the app, in the same given location and time. All records, however, are currently processed equally. Another example of inconsistent usage patterns of different mobile apps relates to different mobile app usage patterns across different activities. For example, low usage in dining apps, as opposed to high usage in shopping apps, resulting in issuing a larger number of records for users during the activity of shopping, as opposed to dining users. Yet another example of inconsistency is the property (location) structure which strongly affects the quality and quantity of GPS signal records that are received (indoor locations which produce less GPS signals, as opposed to outdoor locations, and external areas in the location, as opposed to internal walls which block GPS signaling), etc. The above inconsistency in the representation level of the data can mean, for example, that while X visits of users reflected by the data records issued for one location can represent 1% of the actual visits of users occurring in that location at a given time, the same amount of visits for a different location can represent 0.2% or 2% of its actual visits.

Therefore, an accurate footfall estimation based on GPS signalling is desired.

GENERAL DESCRIPTION

The presently disclosed subject matter concerns, in certain embodiments, estimating footfall for a given location, in an accurate manner, irrespective of the inconsistency in usage patterns explained above, based on raw data, including visitation data of users. As explained above, the raw data includes data records representing visitation data of users. The presently disclosed subject matter may include, in accordance with certain embodiments, obtaining visitation data including raw data relating to users' activity in a location, clustering all visitation data received from all users into clusters of visits. Each cluster of visits represents a visit of one user in a given location and time interval, and determining a footfall estimation, based on the clusters of visits for a given location during a certain time interval. In some examples, in order to determine the footfall estimation, a machine learning (ML) estimation model, operating a set of features, is applied on the clusters of visits. Some features of the ML model may include features relating to the users, the users' visits in a location, the location, or the location's surroundings.

As will be explained below with reference to the description of the features in FIG. 4, according to certain embodiments of the presently disclosed subject matter, clustering the visitation data into clusters of visits and applying the ML model with features relating to the clusters of visits, instead of the raw visitation data, assists in providing a more accurate footfall estimation for a given location, irrespective of the inconsistency in usage patterns in the visitation data, as explained above. In addition, transforming the raw data into clusters of visits, and storing the clusters, instead of the raw data, requires less storage space. Moreover, applying the ML model on the clusters of visits reduces the computational time and resources required to process the data to obtain the footfall estimation, as several numbers of records in the visitation data may be clustered into one cluster of a visit, thus resulting in a lesser amount of data to process. In addition, during the training process, a lesser amount of data and resources are required in order to train the ML models.

According to one aspect of the presently disclosed subject matter, there is provided a computerized method for estimating footfall for a location of one or more users, by a processor and memory circuitry (PMC), the method comprising:
 a) obtaining visitation data including a plurality of visit data items, wherein each visit data item includes at least data indicative of visit time and visit coordinates associated with a user of the one or more users;
 b) grouping the obtained visitation data to one or more groups of visit data items, wherein each group is associated with a respective user;
 c) for each group, assigning the data items in the group to one or more clusters of visits, including, for each visit data item:
  assigning the data item to a given cluster of the clusters if at least the visit time data and the visit coordinates data of the data item comply with corresponding visit time and visit coordinate conditions that are associated with the given cluster, and
 d) determining, based on the one or more clusters of visits data, a footfall estimation for a location, wherein the footfall estimation for the location is indicative of a number of visits of the one or more users in the location within one or more time intervals.

In addition to the above features, the method according to this aspect of the presently disclosed subject matter can optionally comprise one or more of features (i) to (xiv) listed below, in any technically possible combination or permutation:
 (i) wherein at least one cluster of the one or more clusters of visits includes at least two data items;
 (ii) wherein obtaining visitation data comprises pre-processing the visitation data, using at least one of:
  normalizing one or more of the visit data items to a predefined unified form;
  extracting one or more anomalous visit data items; and
  updating one or more of the visit data items to include additional data pertaining to the visitation data;
 (iii) wherein the data indicative of visit coordinates included in each item includes data on geographical coordinates obtained from one or more mobile devices;
 (iv) wherein assigning the data item to the given cluster of the clusters comprises:
  determining that the difference between the visit time of the data item and at least one visit time associated with the given cluster does not exceed a time threshold, and that the distance between the visit coordinates of the data item and at least one visit coordinate associated with the given cluster, does not exceed a distance threshold; and
  assigning the data item to the given cluster;
 (v) wherein determining that the difference between the visit time of the data item and the at least one visit time that is associated with the given cluster, does not exceed the time threshold, including determining that visit time of the data item and a visit time of one or more of data items already assigned to the give cluster do not exceed the time threshold;
 (vi) wherein determining that the distance between the visit coordinates of the data item and the visit coordinates that are associated with the given cluster do not exceed the coordinates threshold, including determining that visit coordinates of the data item and visit coordinates of one or more data items already assigned to the give cluster do not exceed the distance threshold;
 (vii) wherein determining footfall estimation comprises:
  providing a plurality of ML estimation models, wherein each of the ML estimation models are trained to estimate footfall of a location while operating on a set of features, wherein at least one feature of the set of features is a feature relating to a cluster of visits;
  selecting at least one machine learning (ML) estimation model of the plurality of ML estimation models, according to at least one feature of the operated set of features; and
  using the selected ML estimation model for determining the footfall estimation for one or more locations;
 (viii) wherein at least one additional feature of the set of features is selected from a group comprising: a location characterizing feature, a location's surroundings characterizing feature, location's visits characterizing feature, location's visitors characterizing feature, or a combination thereof;
 (ix) wherein the at least one feature of the set of features is selected from a group that includes: spreadness of visits in the location, and data relating to profiles of visitors;
 (x) wherein the method further comprises:
  c1) determining representative visit time data and representative visit coordinates data for each one of the clusters of visits based on the visit time data and visit coordinate data of the data items in the respective cluster; and
  d) determining the footfall estimation for one or more locations;
  wherein, at least one feature of the set of features relates to the determined representative visit time data or the determined representative visit coordinates data;
 (xi) wherein selecting the at least one ML estimation model further comprises:
  retrieving a respective model weight for each of the selected at least one ML estimation models, wherein a model weight is calculated based on accuracy level of the ML model, as determined during training of the ML model, with respect to the set of features operated by the ML model; and
  using the at least one selected ML estimation model with the respective retrieved model weight;
 (xii) wherein at least one of the locations has a shape of a polygon predefined using geographical coordinates.
 (xiii) wherein at least one of the locations has a shape of a circular area predefined by a center of the circular area.
 (xiv) the method further comprising:
  c1) associating one or more clusters of visits with a respective visits weight based on data that pertains to the clusters of visits and/or additional data that pertains to the at least one user;

d) determining the footfall estimation, based on the clusters of visits data and the associated respective visits weight.

According to another aspect of the presently disclosed subject matter there is provided a system for estimating footfall for a location of one or more users, by a processor and memory circuitry (PMC), the processor being configured to:

a) obtain visitation data including a plurality of visit data items, wherein each visit data item includes at least data indicative of visit time and visit coordinates associated with a user of the one or more users;

b) group the obtained visitation data into one or more groups of visit data items, wherein each group is associated with a respective user;

c) for each group, assign the data items in the group to one or more clusters of visits, including, for each visit data item:

assign the data item to a given cluster of the clusters if at least the visit time data and the visit coordinates data of the data item comply with a corresponding visit time and visit coordinates conditions that are associated with the given cluster, and d) determine, based on the one or more clusters of visits data, footfall estimation for a location, wherein the footfall estimation for the location is indicative of a number of visits of the one or more users in the location within one or more time intervals.

According to yet another aspect of the presently disclosed subject matter there is provided a non-transitory computer readable storage medium tangibly embodying a program of instructions that, when executed by a computer, cause the computer to perform a method for estimating footfall for a location of one or more users, by a processor and memory circuitry (PMC), the method comprising:

a) obtaining visitation data including a plurality of visit data items, wherein each visit data item includes at least data indicative of visit time and visit coordinates associated with a user of the one or more users;

b) grouping the obtained visitation data into one or more groups of visit data items, wherein each group is associated with a respective user;

c) for each group, assigning the data items in the group to one or more clusters of visits data, including, for each visit data item:

assigning the data item to a given cluster of the clusters if at least the visit time data and the visit coordinates data of the data item comply with corresponding visit time and visit coordinate conditions that are associated with the given cluster, and d) determining, based on one or more clusters of visits data, a footfall estimation of a location, wherein the footfall estimation for the location is indicative of a number of visits of the one or more users in the one or more locations within one or more time intervals.

According to yet another aspect of the presently disclosed subject matter there is provided a computerized method for training a machine learning (ML) estimation model to estimate footfall for a location, by a processor and memory circuitry (PMC), the method comprising:

a) obtaining training visitation data including a plurality of visit data items, wherein each visit data item includes at least data indicative of visit time and visit coordinates associated with a user;

b) grouping the obtained training visitation data into one or more groups of visit data items, wherein each group is associated with a respective user;

c) for each group, assigning the data items in the group to one or more clusters of visits data, including, for each data item:

assigning the data item to a given cluster of the clusters if at least the visit time data and the visit coordinates data of the data item comply with corresponding visit time and visit coordinate conditions that are associated with the given cluster, training a machine learning (ML) estimation model having a specified set of features, based on one or more clusters of visits data, to estimate footfall for a given location, wherein the footfall estimation is indicative of a number of visits of one or more users in the location within one or more time intervals.

The system, method and the non-transitory computer readable storage media disclosed herein according to various aspects, can optionally further comprise one or more of features (i) to (xiv) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

As apparent from the following discussions, and unless specifically stated otherwise, it is appreciated that throughout the specification discussions utilizing terms such as "obtaining", "grouping", "assigning", "determining", "normalizing", "extracting", "updating", "selecting", "using", "retrieving", "training", "providing", "associating", or the like, refer to the action(s) and/or process(es) of a computer that manipulate and/or transform data into other data, the data represented as physical, such as electronic, quantities and/or the data representing the physical objects. The term "computer" should be expansively construed to cover any kind of hardware-based electronic device with data processing capabilities including, by way of non-limiting example, the footfall estimation system disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

The terms "non-transitory memory" and "non-transitory storage medium" used herein should be expansively construed to cover any volatile or non-volatile computer memory suitable to the presently disclosed subject matter.

Figure 1:
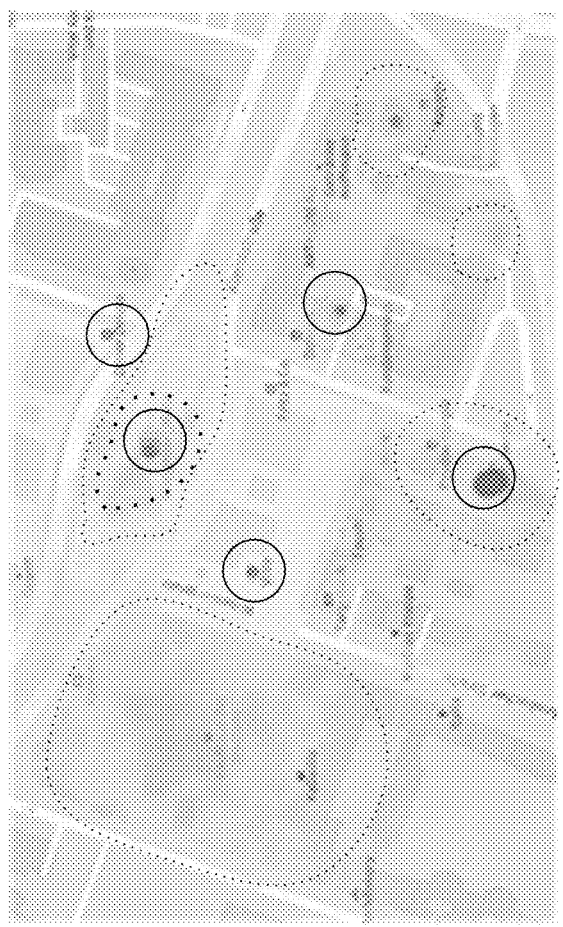
FIG. 1 illustrates examples of heat maps for given locations as known in the art.
Figure 1:
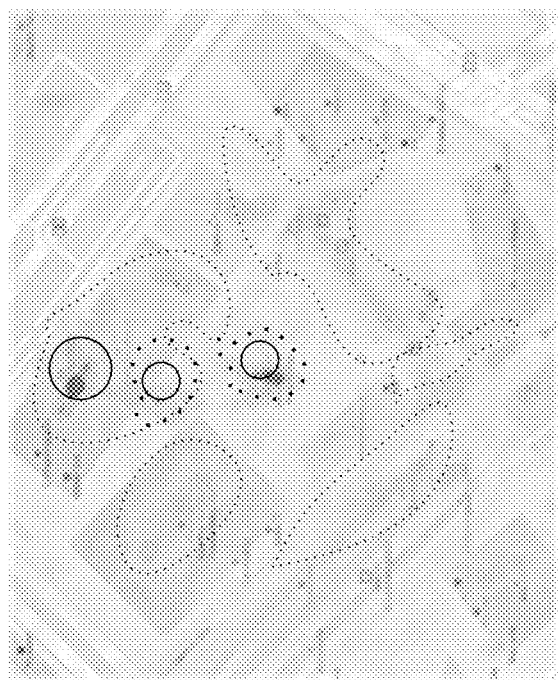
Figure 2:
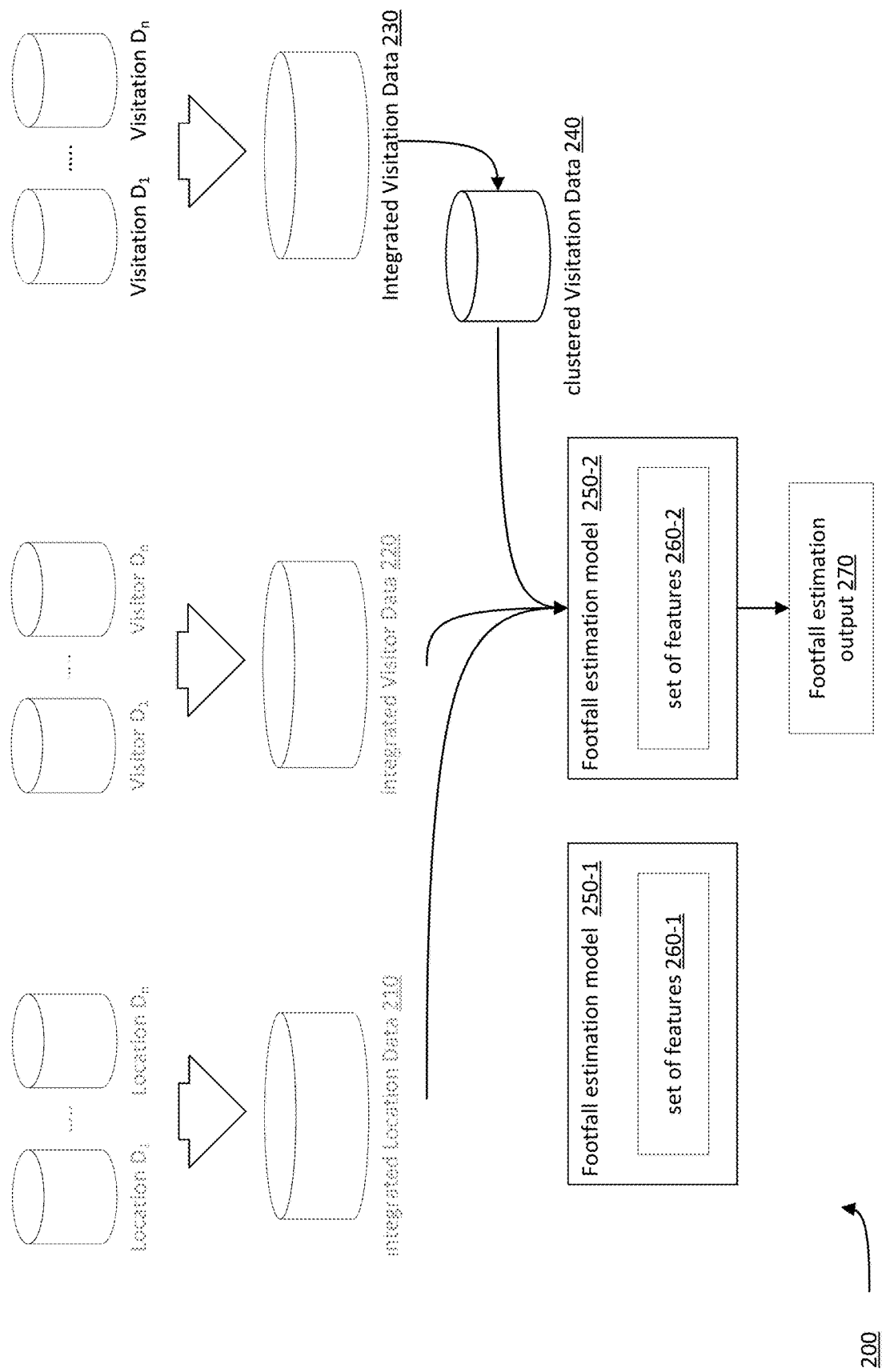
FIG. 2 illustrates a data flow diagram that illustrates data flow and associated operations carried out during the footfall estimation process, in accordance with certain embodiments of the presently disclosed subject matter.

Bearing this in mind, reference is made to FIG. 2 illustrating a data flow diagram that illustrates data flow and associated operations carried out during the footfall estimation process, in accordance with certain embodiments of the presently disclosed subject matter. As illustrated in FIG. 2, in some examples, raw data can be obtained from one or more visitation data sources illustrated by Visitation $D_1$ to Visitation $D_n$ data sources. Visitation $D_1$ to Visitation $D_n$ include visitation data of users, including a plurality of visit data items. Visitation data can be received e.g. from an operator of an application, a service provider, or third party aggregators of visitation data. The plurality of visit data items may include masses of records, where each record may include a reading of a GPS signal including geographical coordinates, with a time stamp during which the reading of the signal was received from a mobile device operated by a user, and the identity of the user operating the device. Each record can also include additional data such as an ID of the application that issued the record, horizontal/vertical accuracy, device model/operating system, velocity (speed) of device when signal was captured (e.g. walking vs. driving). It should be noted that a record, as described above, is one example of a data item, and, for simplicity, the explanation below refers to records. However, a person versed in the art would find additional data included in the records to be also relevant for the presently disclosed subject matter.

In some examples, the data received from the numerous visitation data sources can be received in different forms e.g. a plurality of records that include different fields of data. To ease processing, the data can be integrated into one form of data. Hence, data from Visitation $D_1$ to $D_n$ can be integrated to integrated Visitation data 230.

In some cases, in order to reduce the effect of inconsistency in the representation level of the data as explained above, the integrated visitation data is then clustered into clusters of visits of a user, where each cluster represents a visit of the user in a specific location during a specific time period or interval. The aim is to cluster data records that are issued for each user, in the same location defined by geographical boundaries, at a certain time period, into one "visit", represented by a cluster of visits, and estimate the footfall based on the data indicative of a cluster that includes a plurality of data items as one visit of the user, rather than on the distinct data items (say records). The data indicative of a cluster may include representative visit time data and representative visit coordinates data for each one of the clusters of visits. As described below with respect to FIG. 4, the cluster with the representative time data and representative visit coordinates data, can later be used to generate one or more features for the feature vector for the ML model. The term "visit" should broadly include the presence of a user in a given location during a certain time interval. In terms of visitation data and data records issued for a given user, the term "visit" can include a cluster of all data records of a user, that meet certain geographical coordinates and time conditions. The conditions will further be explained below with respect to FIG. 4. In some examples, representative visit time and representative visit coordinates data are defined for each cluster of visit, based on the visit time data and visit coordinate data of the data items that were already assigned to the cluster, such that the cluster of visits represents the items that are assigned to it. To illustrate the cluster of visits, by way of a non-limiting example, consider a user visiting a certain store for a certain period of time (e.g. between 10:00-10:15). The user runs several mobile apps in his mobile device, where each app issues several records during the visit in the store. The records issued while the user visited the store, include geographical coordinates that are adjacent to each other, in terms of the distance between the geographical coordinates of the records, and include time stamps of the records, that relate to a specific time period (during the above time). These records may be clustered into one visit of the user. Once the user leaves the store, and visits a second store, e.g. between 10:16-10:30, the records issued during the visit of the user in the second store will be clustered into a second, different, cluster of the user, constituting a second visit of the user. Each visit of the user may be represented by representative visit time and coordinates, based on the records that are assigned to the visit. Thus, the first cluster of visit in the first store may be represented by a representative time of 10:00-10:15 and represented by an area defined by the geographical coordinates in the records assigned to the first cluster (that may substantially correspond to the coordinates of the first store), and the second cluster of visits in the second store may be represented by a representative time of 10:16-10:30 and represented by an area defined by the geographical coordinates in the records assigned to the second cluster (that may substantially correspond to the coordinates of the second store). Therefore, clustering the received Integrated Visitation data 230 includes clustering the records into one or more clusters of visits of several users. The clustered visitation data of the users is represented by clustered Visitation Data 240 in FIG. 2.

In addition, in some examples, raw data can also be obtained from other data sources including location data and visitors' data. Location data sources Location $D_1$ to Location $D_n$ may include raw data on one or more locations. For example, data on a location can include data relating to the structure of the location e.g. indoor location (such as a mall)/outdoor location (such as a touristic piazza along a road), the relative location of the location of interest in the city (e.g. in the center of the city or in the suburbs), the purpose of the location (e.g. shopping center), and ranking of the location. Visitor $D_1$ to Visitor $D_n$ may include data on the visitors, e.g. the users operating the mobile devices, for which geographical data is received. The data on visitors can include data on the profiles of the users, e.g. as obtained from social media relating to the users, phone usage data, visited locations data, area of residence/work data, age of the user, and gender of the user. In some examples, raw data on the users may be used to extract data on locations. For example, phone usage of users in an area can be indicative of the population in the area, average age of users, and such. In some examples, the raw data received from the numerous visitation data sources can also be received in different forms and include different fields of data. Hence, to ease processing, the raw location data and visitors' data can also be integrated into one form of data. Hence, data from Location $D_1$ to Location $D_n$ can be integrated to integrated Location data 210 and data from Visitor $D_1$ to Visitor $D_n$ can be integrated to integrated Visitor data 220.

In some cases, the raw data, including the clustered visitation data, is then processed to determine footfall estimation in a given location. The given location may have a predefined shape, such as a polygon predefined using geographical coordinates, or a circular area predefined by a center of the circular area. According to some embodiments of the presently disclosed subject matter, an estimated footfall in a given location indicates the number of visits of users, in the location, within a certain time interval.

In some cases, in order to determine a footfall estimation in a given location, at least one ML estimation model is selected and used from a plurality of ML estimation models. Hence, as illustrated in FIG. 2, data from integrated location data 210, integrated visitors data 220 and integrated visitation data 230 constitutes an input to footfall estimation model 250-2, operating a set of features 260-2. Footfall estimation model 250-2 is selected from the ML estimation models 250-1 and 250-2. Selecting a ML model and the features of the ML models is further described below with respect to FIG. 4.

The output of the ML estimation model 250-2 is footfall estimation output 270 indicative of a number of visits of one or more users in the location, in one or more time intervals.

Figure 3:
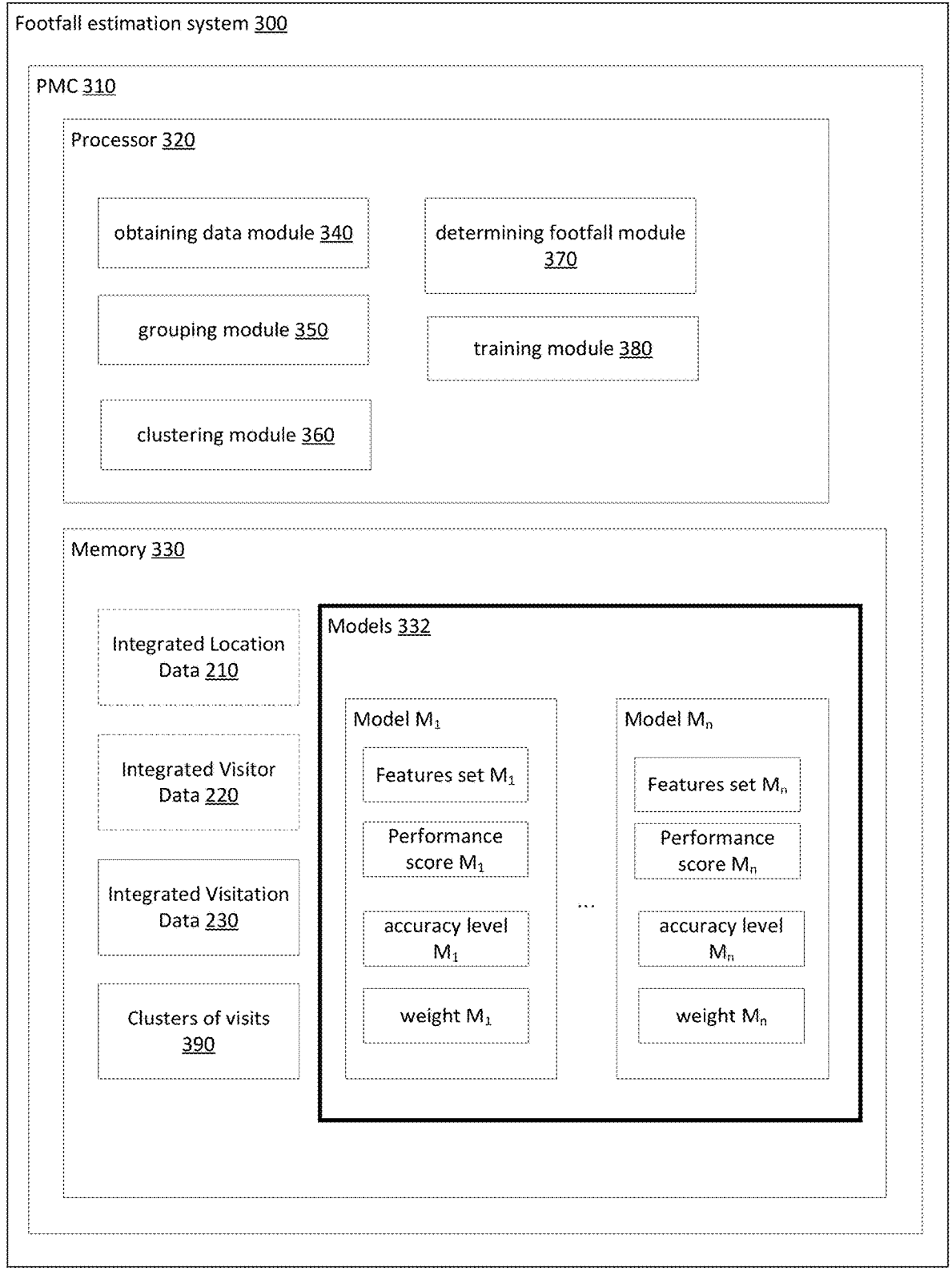
FIG. 3 illustrates a high-level functional block diagram of a footfall estimation system, in accordance with certain embodiments of the presently disclosed subject matter.

Bearing this is mind, reference is now made to FIG. 3 illustrating a high-level functional block diagram of a footfall estimation system 300, in accordance with certain embodiments of the presently disclosed subject matter. The footfall estimation system 300 is configured to estimate footfall for one or more locations of one or more users, where the footfall estimation is indicative of a number of visits of the users in the location, within one or more time intervals.

In some cases, the footfall estimation system 300 comprises a processor and memory circuitry (PMC) 310 comprising a processor 320 and a memory 330. The processor 320 is configured to execute several functional modules in accordance with computer-readable instructions implemented on a non-transitory computer-readable storage medium. Such functional modules are referred to hereinafter as comprised in the processor 320. The processor 320 can comprise an obtaining data module 340, a grouping module 350, a clustering module 360, a determining footfall module 370 and a training module 380.

The obtaining data module 340 is configured to obtain raw data, including visitation data. For example, obtaining data module 340 is configured to obtain data from Integrated Visitation Data 230 illustrated in FIG. 2. As explained with respect to FIG. 2, Integrated Visitation Data 230 integrates data obtained from one or more data sources visitation data $D_1$ to $D_n$. Each visitation data $D_1$ to $D_n$ may include a plurality of visit data items, where each visit data item includes at least data indicative of visit time and visit coordinates associated with a user. In some examples, the visit time includes the time stamp in which the visit data item was issued. The visit coordinates may include the geographical coordinates included in the visit data item, as obtained from one or more applications running on the mobile devices operated by the users.

In some examples, obtaining data module 340 is further configured to pre-process the visitation data, for example, by normalizing one or more of the visit data items to a predefined, unified, form, e.g. to ease processing. Alternatively or additionally, obtaining data module 340 can extract one or more anomalous visit data items, for example, by removing outlier data items that are extremely distanced from other data items in terms of geographical coordinates, or an unreasonable number of data items issued by a single user. Alternatively or additionally, obtaining data module 340 can update one or more of the visit data items to include additional data pertaining to the visitation data, e.g. by enriching the data item with additional data such as the city or postal code retrieved from external databases, based on the coordinates data of the data item. As described below with respect to FIG. 4, the updated data item can later be used to generate one or more features for the feature vector for the ML model. The above illustrates some examples of pre-processing of the data. Additionally, other known per se methods can be used. Pre-processing the data items is further described below with reference to block 420 in FIG. 4.

In some examples, in addition to obtaining visitation data, obtaining data module 340 is configured to obtain raw data from one or more additional sources, e.g. from Integrated Location Data 210 and Integrated Visitor Data 220 illustrated in FIG. 2, which integrate location data $D_1$ to $D_n$ and Visitor $D_1$ to Visitor $D_n$, respectively. Integrated Location Data 210, Integrated Visitor Data 220 and Integrated Visitation Data 230 can be stored, e.g. in memory 330.

In some cases, once the raw data is obtained, and optionally pre-processed, a grouping module 350, comprised in processor 320, is configured to group the obtained visitation data into one or more groups of visit data items, wherein each group is associated with a respective user. For example, the visit data items can be divided into groups, where each group of visit data item was issued from the same user. For each group, clustering module 360 comprised in processor 320, is configured to cluster the visit data items in the group to one or more clusters of visits. For example, clustering module 360 is configured, for each data item in a group, to assign the data item to a given cluster if, at least, the visit time data and the visit coordinates data of the data item, meet certain conditions. For example, certain conditions may include that the visit time data and the visit coordinates data comply with corresponding visit time and visit coordinates conditions that are associated with the given cluster, for example, if the difference between the visit time of the data item and at least one visit time that is associated with the given cluster do not exceed a time threshold, and if the distance between the visit coordinates of the data item and at least one visit coordinates that are associated with the given cluster do not exceed a distance threshold. In some examples, at least one visit time that is associated with the given cluster can include visit time of one or more data items already assigned to cluster. Similarly, in some examples, at least one visit coordinates that are associated with the given cluster can include visit coordinates of one or more data items already assigned to cluster. With reference to the example above of a user visiting a store for a certain period of time (e.g. between 10:00-10:15), one should consider that records issued by different mobile apps, during the time that the user visited the store, can be assigned to the same cluster. The cluster constitutes a visit of the user in particular geographical coordinates (which may correspond to particular coordinates of a store location) within a certain time interval. Assume for example that 10 records were issued between 10:00-10:15, for that particular user. The first record of the above, issued at 10:00 in certain geographical coordinates (which appears to correspond to geographical coordinates of the first store) may issue a new cluster of visit. For the next second record, issued at 10:04 with the same/different geographical coordinates, it is determined, whether the difference between the data time of 10:04 and the data time of the record already in the cluster, i.e. 10:00, do not exceed a time threshold, e.g. of 15 minutes. In addition, it is determined, whether the distance between the data coordinates of the new record and the data coordinates of the record already in the cluster, do not exceed a distance threshold, e.g. of 10 meters. If the conditions are met, the second record is assigned to the existing cluster along with the first records. Otherwise, in some examples, a new cluster is formed for the second data item. Other/additional time and distance conditions may be applied. For example, a data set of locations can be provided, where each location is represented by a polygon defined by geographical coordinates representing its boundaries. Each cluster can be associated with a location. A new data item can be assigned to a cluster, if the new data item resides within the same polygon as the one associated with the cluster, and/or, if it does not reside within another polygon, other than the polygon associated with the cluster.

In some examples, clustering module 360 is further configured to determine representative visit time data and representative visit coordinates data for each one of the clusters of visits, based on the visit time data and visit coordinate data of the data items in the respective cluster. For example, the representative visit time data can define a time interval which starts from the earlier time included in all data items assigned to the cluster, and ends at the latest time included in all data items assigned to the cluster. In the above example of a user visiting the store, assume that the cluster includes 10 records, the earlier of which was issued at 10:00, and the last one was issued at 10:14. The representative visit time data of the cluster can define a time interval of 14 minutes starting 10:00. The representative visit coordinates data can include an area defined by the coordinates of all data items assigned to the cluster. For example, the boundaries of the area can be defined by the farthest coordinates included in the data items in the cluster. Alternatively or additionally, the representative visit time or coordinates data of a cluster can be the average time or coordinates of data items assigned to a cluster. Further details on how to form a cluster, associate the cluster with visit time and visit coordinates, assigning data items to the cluster and determining a representative visit time and representative visit coordinates, are further explained below with respect to FIG. 4. As described below with respect to FIG. 4, the cluster with the representative time data and representative visit coordinates data, can later be used to generate one or more features for the feature vector for the ML model.

In some cases, after clustering the data items into visits, a determining footfall module 370, comprised in processor 320, is configured to determine a footfall estimation for one or more locations. The determination can be based on representative visit time and the representative visit coordinates data of one or more clusters of visits data. The footfall estimation for each location is indicative of a number of visits of one or more users for which data was obtained, in each location, within one or more time intervals.

In some examples, a determining footfall module 370 is configured to provide a plurality of machine learning (ML) estimation models, where each of the ML estimation models is trained to estimate footfall of a location while operating on a set of features. As explained below with respect to FIG. 6, it should be noted that each ML model can be an instance of known per se ML models of a different type (e.g. XGBoost, Random Forest, Deep Learning networks). Each ML model can have different settings and/or different configuration, and operates on a set of features. Determining footfall module 370 is configured to select at least one ML estimation model of the plurality of ML estimation models, according to at least one or more features of the operated set of features, and to use the selected ML model for determining the footfall estimation. In order to select a ML model, determining footfall module 370 may form a feature vector from the obtained visitation data, and optionally from additional data such as the representative time data and representative visit coordinates data, the data that was updated in each data item in the pre-processing stage, and so forth. The formed feature vector is generated and will be input into the selected ML model. The feature vector includes one or more features. Once the input feature vector is generated, the values of the features are estimated or calculated if possible, based on the obtained data. For example, a feature can be "number of distinct users seen in the location". The value of this feature can be determined based on the obtained visitation data, e.g. based on the number of distinctive IDs of users that are identified in the visitation data. In order to select a ML model, determining footfall module 370 is configured to select the ML which best performs with respect to the values of the formed input feature vector. For example, a ML model which uses a feature vector that includes the feature of the "number of distinct users seen in the location", and has a high accuracy level (based on low error rate), can be selected. The process of choosing a ML model according to at least one or more features of the operated set of features is further described below with respect to FIG. 4.

In some examples, at least one feature of the set of features is a location feature or a location's surroundings feature, and selecting the ML model is according to the location feature or a location's surroundings feature. Model $M_1$ to Model $M_n$, each with respective set of features $M_1$ to $M_n$, can be stored in Models 332, comprised in memory 330.

In some examples, determining footfall module 370 is further configured to retrieve a respective model weight for each of the selected ML estimation models and use the selected ML estimation model with the respective retrieved model weight. During the training stage, the accuracy level (which is also referred to hereinbelow as error rate) of each model is evaluated, with respect to the set of features operated by the ML model. Based on the accuracy level, a ML model weight is calculated. A ML model weight can be used e.g. in order to determine how to evaluate the ML model with the operated set of features, with respect to the accuracy performance of the ML model by itself, or with respect to other trained ML models. For example, a ML model can have a high accuracy level, i.e. the accuracy performance of the ML model in the footfall estimation, as evaluated during the training stage, is close to the real footfall count of the location. Based on the high accuracy level, a high weight value can be associated with the ML model, and can be used during the inference stage, with new visitation data. In cases where more than one ML model is used, each ML model can be used with the respective model weight to better reflect the accuracy level of each ML model. The respective accuracy level and model weight for each ML model can also be stored in Models $M_1$ to $M_n$. Hence, determining footfall module 370 is configured to retrieve a respective model weight for each of the selected ML estimation models and use the selected ML estimation model with the respective retrieved model weight. For example, a ML model can be selected, and be used to determine a footfall estimation for the location, while the output of the model can be weighted according to its respective weight to provide the footfall estimation. In examples where more than one ML model is selected and used for determining the estimation, the outputs of each selected ML model can be aggregated in a weighted manner, according to the respective weight of each ML model, to provide a single output. The ML models with the set of features, the accuracy level and ML weights, are further described below with respect to FIG. 4.

As explained above, processing the obtained visitation data in an equal manner, as done in known systems, results in an inaccurate estimation of footfall in a location. Clustering the data items that pertain to the same visit in one cluster, and applying a ML model on the clusters of visits, assist in determining the footfall estimation in a more accurate manner. For example, clustering data items into clusters, instead of applying the ML model on all data items individually, assists in overcoming the inconsistency in a large amount of records being issued by younger users in social media apps versus a smaller amount of records being issued by older users. The reason is that the large amount of records, as well as the smaller amount of records, will each be classified into one cluster only (one cluster for the younger users, including a large amount of data items, and one cluster for the older users, including a small amount of data items), and the ML model will be applied, based on the clusters. Representative visit time data and representative visit coordinates data for each one of the clusters of visits can be determined based on the visit time data and visit coordinate data of the data items in the respective cluster. In such cases, the cluster with the representative visit time data and representative visit coordinates data can be used to generate one or more features for the ML model, instead of the data items assigned to each cluster. Similarly, the inconsistency in the amount of records issued by different apps can be reduced by clustering the data items into clusters and using the clusters, and optionally using the representative visit time data and representative visit coordinates data for each one of the clusters, in the ML model.

Differences between the clusters, in terms of the amount and type of records that are assigned to each cluster, e.g. clusters with a large amount of data items versus clusters with just few data items, may affect the determination of the footfall estimation, through the operated set of features. For example, one feature which may be used by the ML model in the feature vector can be the "total number of distinct applications". The obtained visitation data can be clustered into clusters of visits, while indicating, for each cluster, the total number of distinct applications in the cluster. In case that a large number of "total number of distinct applications" is identified in the obtained visitation data, a ML model that includes a feature of "total number of distinct applications" and that has a high accuracy level, can be selected and used. The set of features is further disclosed below with reference to FIG. 4.

It is noted that the teachings of the presently disclosed subject matter are not bound by the footfall estimation system 300 described with reference to FIG. 3. Equivalent and/or modified functionality can be consolidated or divided in another manner and can be implemented in any appropriate combination of software with firmware and/or hardware and executed on a suitable device. Those skilled in the art will also readily appreciate that the data repositories such as Integrated Location Data 210, Integrated Visitor Data 220, Integrated Visitation Data 230 and memory 330 can be consolidated or divided in other manner; databases can be shared with other systems or be provided by other systems, including third party equipment, where at least part of the data can be hosted in the cloud.

Figure 4:
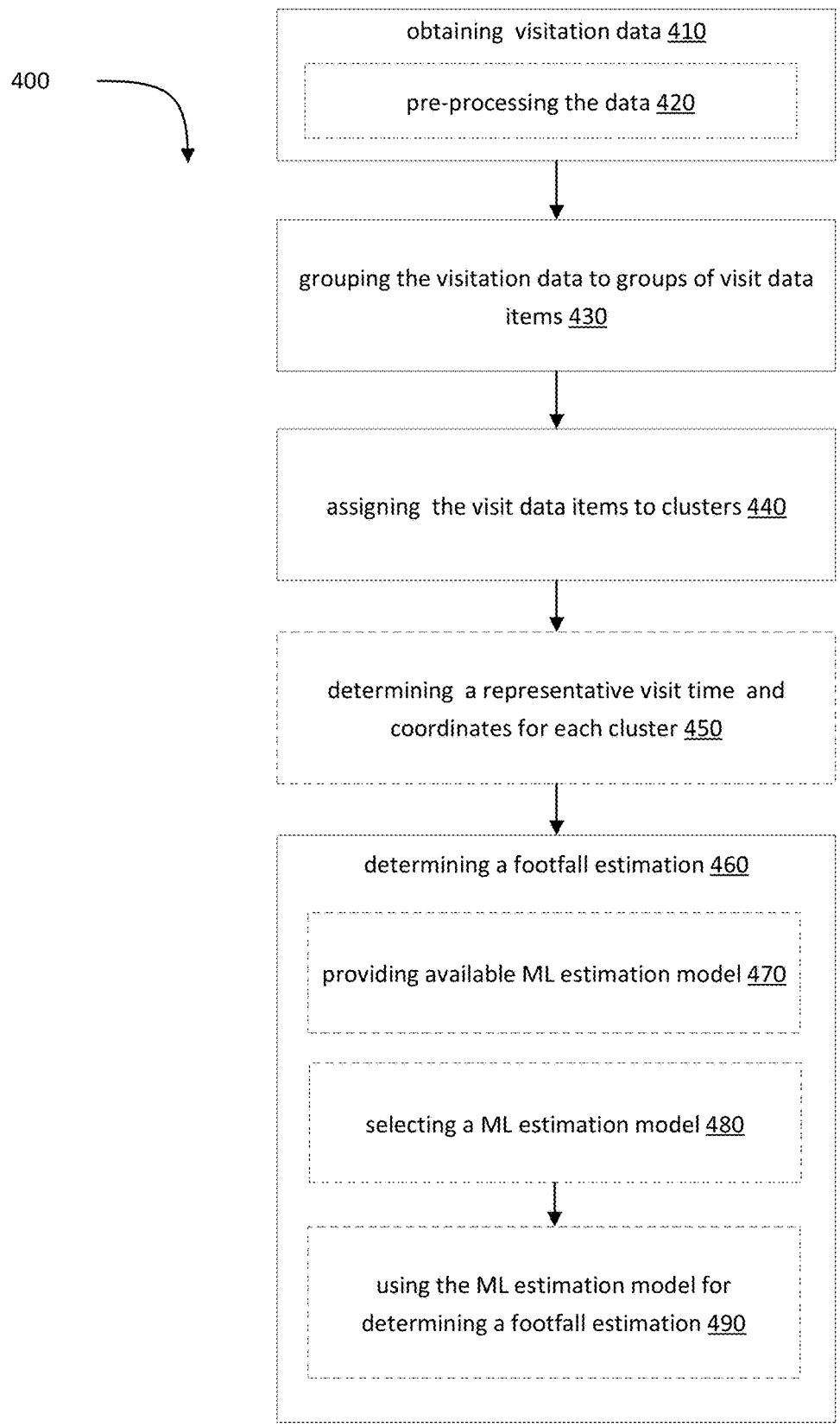
FIG. 4 illustrates a general flowchart of the footfall estimation process, in accordance with certain embodiments of the presently disclosed subject matter.

Referring to FIG. 4, this illustrates a general flowchart of the footfall estimation process 400, in accordance with certain embodiments of the presently disclosed subject matter. The operations can be performed by modules in the footfall estimation illustrated with reference to FIG. 3.

Figure 5:
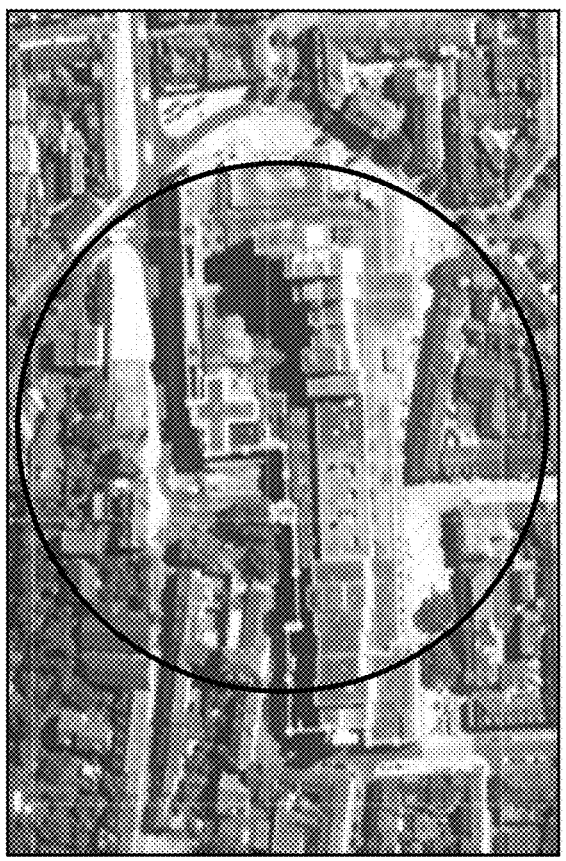
FIG. 5 illustrates examples of location shapes, in accordance with certain embodiments of the presently disclosed subject matter.
Figure 5:
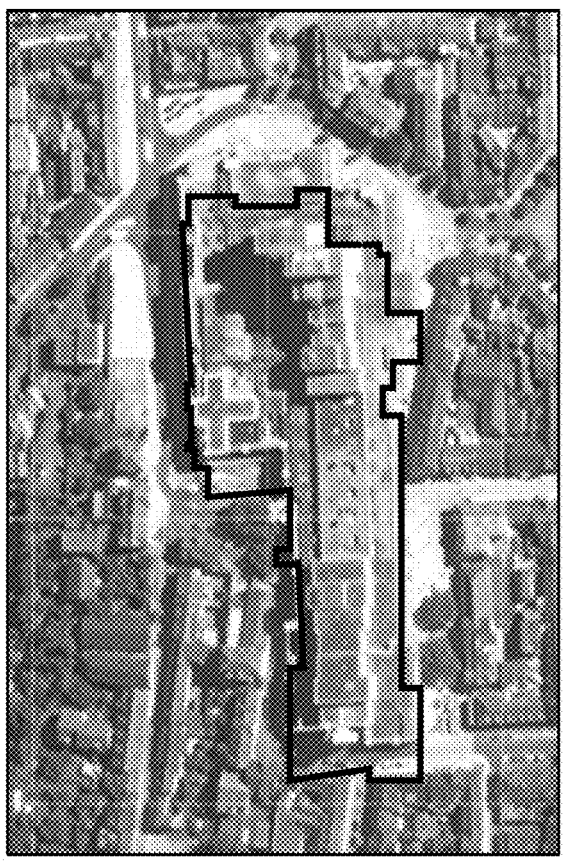

As described above, footfall estimation system is configured to estimate a footfall for one or more locations. Reference is now made to FIG. 5 which illustrates, in a non-limiting manner, examples of location shapes, in accordance with certain embodiments of the presently disclosed subject matter. As illustrated, location 510 can have a shape of a polygon based on geographical coordinates. Alternatively, the location can have a shape of a circular area, predefined by a center of the circular area. The location can be predefined and stored, e.g. in Integrated Location Data 210 in memory 330. In some examples, estimating a footfall for one or more locations includes estimating a footfall where at least one of the locations has a shape of a polygon predefined using geographical coordinates, or at least one of the locations has a shape of a circular area predefined by a center of the circular area. As mentioned above, in case a data set of locations is provided, data items can be assigned to a cluster only if they "fall" within the boundaries of a location associated with the cluster. Assigning only data items that belong to a given polygon assists in providing a more accurate footfall estimation with respect to a location.

Reverting back to FIG. 4, in some cases, in order to estimate a footfall for one or more locations of one or more users, visitation data, including a plurality of visit data items, is obtained (block 410), e.g. by obtaining data module 340 of FIG. 3. In some examples, obtaining the visitation data includes receiving from one or more data sources, such as visitation $D_1$ to $D_n$ illustrated in FIG. 2, a plurality of visit data items. For example, each visit data item can be generated by a mobile application running on a mobile device operated by a user, via GPS technology, and includes the user' ID. Thus, each record includes at least data indicative of visit time, derived from the time stamp in which the record was issued, and the visit coordinates, using GPS technology. The visit time and coordinates are associated with a particular user of the one or more users for which data items were obtained.

In some cases, the obtained visitation data is then grouped into groups of visit data items, where each group is associated with a respective user. However, in some examples, prior to grouping the obtained data, the obtained data is pre-processed (block 420), e.g. by obtaining model 340. obtaining model 340 can normalize obtained visit data items into a predefined unified form. For example, the following fields can be extracted from each data item: user ID (represented by e.g. a device ID), time, longitude, and latitude. In addition, a country or postal code can be determined, based on the longitude and latitude, and other manipulations on the data can be made.

In some examples, obtaining model 340 can pre-process the obtained visitation data by extracting one or more anomalous visit data items. Anomalies in data items can appear for users or geographical coordinates. Anomaly with respect to a user, can be defined as having exaggerated amounts of records issued for a specific user (e.g. a specific device) compared to a standard average ratio of issued records for a user. Anomaly with respect to geographical coordinates can be defined as having exaggerated amounts of records issued for a specific coordinate, compared to a standard average ratio of issued records for a coordinate. Anomalous data items can affect the accuracy of the footfall estimation and can be filtered out. In order to extract one or more anomalous visit data items, obtaining model 340 can sort the records according to frequency of users/coordinates, inspect the rows from top to bottom, and identify a record as an anomaly, if it appears a many more times (e.g. 10 times more) than the following record in the list, or if the record appears a great number of times (e.g. 100 times more than the $99.99^{th}$ percentile of appearances of other records). The above is a one example of identifying and extracting anomalous visit data items, and should not be considered as limiting. A person versed in the art would realize that other methods of extracting anomalous visit data items may be used. For example, anomalous visit data items can be identified and extracted with respect to one or more entities in the geo-hierarchy, e.g. per country, region, city, postal code area, or per location. In some examples, some or all of the anomalous data items can be removed from the visitation data. Yet, in some of the cases, the identification of the anomalous data items can be used in the determining footfall estimation process, as detailed below, e.g. by including a feature in the set of features of the ML model relating to the number of data items in a cluster of visits. The set of features is further explained below. Hence, in some cases, obtaining model 340 does not remove the anomalous data items, and merely identifies them as such in the visitation data.

Yet, in some examples, obtaining model 340 can pre-process the obtained visitation data by populating the visit data items. Populating the visit data items can be done e.g. by updating one or more of the visit data items to include additional data pertaining to the visitation data, e.g. data extracted from Integrated Location Data 210, or data derived from the obtained visitation data. For example, visit data items including geographical coordinates can be updated to include additional data pertaining to entities in the geo-hierarchy, e.g. the state, region, city and postal code correspond to the geographical coordinates of each data item. As described below, the updated data item can later be used to generate one or more features for the feature vector for the ML model.

The above illustrates some examples of pre-processing of the data. Additionally, other known per se methods can be used.

In some cases, once the visitation data is obtained, it is grouped into one or more groups of visit data items, where each group is associated with a respective user (block 430). Grouping the visit data items can be done e.g. by grouping module 350 of FIG. 3. For example, grouping module 350 can sort the visit data items based on the user ID in each data item, and can then can divide the data items into several groups, where each group includes the data items that are associated with one user ID. Dividing the mass data into distinctive groups assists in reducing the computational time required to process the mass data, as each group of records belonging to different user can be processed simultaneously to other groups.

As explained above, in some cases, in order to reduce the effect of inconsistency in the representation level of the data, the visitation data is then clustered into clusters of visits of a user, where each cluster represents a visit of the user in a specific location during a specific time period. The purpose is to cluster data items that are issued in the same location, defined by geographical boundaries, at a certain time period, into one "visit", represented by a cluster of visit, and process the data items belonging to the cluster as one visit of the user. "Visit" can include a cluster of all data items of a user, that meet certain geographical coordinates and time conditions. Hence, in some examples, in order to create one or more clusters of visits for each user, the data items in each group are assigned to one or more clusters (block 440), e.g. by clustering module 360 of FIG. 3. Clustering module 360 can assign a data item to a given cluster if it is determined that at least the visit time data and the visit coordinates data of the data item comply with corresponding visit time and visit coordinate conditions that are associated with the given cluster. Assigning a data item into a cluster is dependent both on time and on coordinates of the data item and the cluster. In some examples, for each data item in a group, clustering module 360 can determine if the difference between the visit time of the data item and at least one visit time that is associated with the given cluster do not exceed a time threshold. The visit time of the data item can be the time stamp that is included in the data item. At least one visit time that is associated with the given cluster can be e.g. the earliest visit time of all data items already assigned to the cluster. The time threshold can be any determined time, e.g. 5 minutes, 1 hour, and so on. Hence, determining if the difference between the visit time of the data item and the visit time that is associated with the given cluster do not exceed a time threshold can be for example, determining that the data item was issued no later than 1 hour from the latest data item already in the cluster. With respect to the coordinates condition, for each data item in a group, clustering module 360 can determine if the difference between the visit coordinates of the data item and the visit coordinates that are associated with the given cluster do not exceed a distance threshold. The visit coordinates of the data item can be the coordinates that are included in the data item. The distance threshold can be defined by the visit coordinates and the distance from any data item in the cluster, and/or distance from all data items in the cluster. Hence, determining that the difference between the visit coordinates of the data item and visit coordinates of one or more data items already assigned to the give cluster do not exceed the distance threshold, can determine that the new data item is not distant from any point in the cluster by certain meters and/or from all points in the cluster by certain meters.

The following function is a non-limiting example of determining when to assign a new data item to a given cluster:

If distance (p, any point in V)<=X meters and distance (p, for all point in V)<=Y meters and (time(p)–time(latest point in V))<Z hours===>True
else===>False.

where V is a visit containing the records accumulated for the current visit up to now, and p is the current point.

In the above example, each new data item will be assigned to the cluster, if the distance from the new data item is not "far" (as defined by X") from any data item that was already assigned to the cluster, and also, if the new data item is not "far" (as defined by Y) from all data items already assigned to the cluster. In addition, the new data item will be assigned to the cluster, and the certain time (defined by Z hours) did not pass from the latest data item in the cluster and the new data item.

In some examples, in order to cluster the groups into clusters of visits, clustering module 360 can sort each group associated with a user, by the time in the data items. As such, a "trail" of the user, defined by the clusters of visit in a sequential order, is obtained. Determining the clusters, can be done e.g. as explained above with respect to assigning each data item to clusters. In these examples, since the data items are sorted by time, once a cluster is formed based on the first data item, clustering module 360 can process each next data item in the "trail" in a sequential manner. For each next data item, clustering module 360 determines if the data item can be assigned to the last cluster formed by one or more of the previous data items, by determining if the time and coordinates conditions are met. Once a certain data item does not meet the time and coordinates conditions with respect to the last formed cluster, it is determined that the following data items in the "trail" will likewise not meet the conditions. Hence, clustering module 360 can summarize the cluster (further explained below), issue a new cluster, and assign the next data item to the new cluster. This process should not be considered as limiting, and a person versed in the art would consider other conditions of clustering the data items into clusters of visits, and other stages of clustering, e.g. without dividing and sorting the data items in the groups.

In some examples, the obtained visitation data is clustered into clusters of visits, such that at least one cluster of the one or more clusters of visits, includes at least two data items. As a result, the number of clusters of visits is less than the number of data items included in the obtained visitation data. These examples, in which the number of clusters of visits is less than the number of data items included in the obtained visitation data, are different from cases where each data item constitutes a cluster by itself. As explained above, the reduced number of clusters of visits is advantageous in terms of reduced computational resources and reduced computational time required to process the data to obtain a footfall estimation. In addition, transforming the raw data into clusters of visits, and storing the clusters, instead of the raw data, requires less storage space.

In some examples, a visits weight can be determined for one or more visits of one or more users. The visit weight (which is different from the weight of the ML model as described throughout the document) represents a weight that each visit or a group of visits should be given, in a relative manner to other visits. The visits weight may assist in reducing deviations or imbalanced representation of population in the visitation data, and to compensate visits of such a population. For example, if a certain population, such as females, is under-represented, then the visits obtained from devices associated with females should be compensated. Another example includes giving a low weight to visits of users, which are characterized by a high number of visits compared to other users, or compared to the number of visits of the users in other locations. The reason for providing a low weight to such users is based on the assumption that the higher the number of visits, the higher the data that is known with respect to the visits of such users, compared to users with a low number of visits. Hence, such imbalanced visits should be given a low weight. Another example for applying visit weights is for normalizing visitation levels over time, e.g. according to a general data levels found in the database. As data levels can change due to artificial reasons (e.g. onboarding a new data supplier, resulting, in a higher visitation level per month), it can be advantageous to normalize the data in a manner such that artificial changes will not impact the resulting trends.

Determining imbalanced data, and which clusters to compensate, can be done e.g. by performing statistics on the clusters of visits or on additional obtained data, e.g. the profile of the user, data on the locations, etc. A weighting scheme can then determine which visits to cluster, and to which extent to "compensate" unbalanced visits. For example, in order to determine which visits to compensate the number of visits of a user in a given location (as obtained from the number of clusters of visits) can be compared against all the visits of the user (as can be obtained e.g. from the profile of the user). Alternatively, or additionally, the number of visits of a particular population (e.g. females, as obtained from visitors' data) can be compared to the total number of visits of all users in the location.

In some examples, weighting the visits may assist in estimating the footfall in a more accurate manner. By a way of non-limiting example, user A which has 5 visits to the given location of a shopping center and has 10 total visits (in any location as stored in his profile) throughout a certain period, will be granted a higher weight compared to user B who has 5 visits to the shopping center and has 100 total visits throughout the same period. Giving a higher visitor weight to user A assumes that the more activity that is known and stored for a given user, the more correlated each signal is with the user's actual amount of activity, thus less weight it can receive, and vice versa—the less total visits stored for a user, the more information would be missing with high likelihood, with regard to this user, including with respect to the given location, and hence, the visitor weight of the user can be higher. The clusters of the user can be updated based on the determined visitor weight, to provide a more accurate footfall based on the updated visitors' clusters. As such, the clusters of visits of user B, for which it is assumed that more information is missing, will have a higher weigh, than the clusters of visits of user A. Following is a non-limiting example of one formula to calculate and determining a visit weight:

$$\text{Weight (visitor)} = \#\text{visits in the location}/\# \text{ all visits}$$

In order to minimize the effect of the total number of visits over the weight, a refined formula can be applied, using e.g. the log function:

$$\text{Weight\_log (user)} = \log(1+\#\text{visits in the location})/\log(1+\# \text{ all visits})$$

The clusters can then be associated with weights. A footfall of the location can be estimated in a more accurate manner, e.g. by summing up the visits using their associated weights, or by breaking down the estimation footfall according to the weights (e.g. by refining the breakdown of the overall footfall estimate to different populations (by age, gender, etc.).

In some cases, once clustering module 360 assigns the data items into a cluster of visits, clustering module 360 can summarize the cluster e.g. by associating the cluster with data that is derived from data items assigned to the cluster and that pertain to the cluster. For example, clustering module 360 can determine representative visit time data and representative visit coordinates data for each one of the clusters of visits, based on the visit time data and visit coordinate data of the data items in the respective cluster (block 450). For example, clustering module 360 can calculate a time interval which starts from the earlier time included in all data items assigned to the cluster and ends at the latest time included in all data items assigned to the cluster, and determine the representative visit time of the cluster to be the calculated time interval. In addition, clustering module 360 can calculate an area defined by the coordinates of all data items assigned to the cluster, e.g. by calculating an area with boundaries defined by the farthest coordinates included in the data items in the cluster. Then, clustering module 360 can determine the representative visit coordinates data for the cluster to include these area boundaries. Additional examples of associating the cluster with data include the number of data items in the cluster of visits, the cluster boundaries (min. latitude, max. latitude, min. longitude, max. longitude), the cluster time (min. standard time, max. standard time, min. local time, max. local time, duration), cluster radius (calculated based on boundaries), cluster center (based on average latitude and average longitude), references to last cluster (e.g. distance from previous cluster, time from previous cluster, speed from previous cluster), and the city associated with the cluster boundaries.

Such additional data can be used to generate one or more features for the feature vector for the ML model. The clusters of visits can be stored, e.g. in clusters of visits 390 in memory 330.

In some cases, based on the one or more clusters of visits, a footfall estimation for one or more locations is determined (block 460), e.g. by determining footfall module 370. Determining footfall module 370 can determine the footfall estimation of a location, based on the one or more clusters of visits data. The footfall estimation for a location is indicative of a number of visits of one or more users for which data was obtained, in the location, within one or more time intervals. As explained above, in cases where the location has a predefined shape, e.g. a polygon predefined using geographical coordinates or a circular area predefined by a center of the circular area, the footfall estimation is indicative of the number of visits of one or more users in the predefined location, in one or more time intervals.

In some examples, in order to determine the footfall estimation, determining footfall module 370 can provide a plurality of ML estimation models. Each of the ML estimation models are trained to estimate footfall of a location while operating on a set of features (block 470). Memory 330 included in PMC 310 can store the ML estimation models, as illustrated by Models 332 comprising Model $M_1$ to Model $M_n$, each with a respective set of features $M_1$ to $M_n$. Therefore, determining footfall module 370 can provide the ML models by retrieving one or more ML models from Models 332. Some examples of the features are exemplified below.

Once the ML models are provided, in some cases, determining footfall module 370 can select a ML estimation model of the plurality of ML estimation models, according to at least one feature of the operated set of features (block 480), and use the selected model for determining the footfall estimation for one or more locations (block 490). In some examples, more than one ML can be selected from the ML models and can be used. Selecting a ML model and using the selected ML model are described below after the description of the exemplary features.

Attention is now reverted to a description of some exemplary features of the set of features operated by the ML models. As known in the art, each ML model operates a set of features comprised of one or more features. The set of features can be extracted from the raw data, forming the features vector input for the ML model. According to certain embodiments of the presently disclosed subject matter, there is provided a plurality of ML estimation models, wherein each of the ML estimation models are trained to estimate footfall of a location while operating on a set of features. At least one feature of the set of features of the ML models is a feature relating to a cluster of visits. For example, the feature relating to a cluster of visits can be any one of: number of distinct users seen in the location, or number of visits in the location. Further examples are listed below. Estimating the footfall using a ML model in which one feature of the set of features is related to the clusters, assists in estimating the footfall in a more accurate manner, as described above with respect to the usage of clustering in the estimation.

Listed below are some non-limiting examples of optional features to be generated and operated by the ML estimation models:

General features: number of distinct users seen in the location (daily, average, during certain period, active users, returning users), number of visits in the location (daily, average, during certain period, trimmed visits (grouping a number of clusters of visits within a location to a single visit of a user e.g. based on visit time data and the visit coordinates data of clusters), features relating to the location (distance between origin/destination of users to the center of the location, spreadness estimation), features relating to the applications that issued the data items (total number of distinct applications), and such.

Data quality features relating to the current day being evaluated: visit duration (max, average), number of distinct apps appearing in the location, average activity of users in the city, average activity of apps on daily level in the city, ratio user per app (users/apps), average number of pings in the city, number of unique users appearing on the day, and accuracy levels of the coordinates.

Time features relating to the time and weather: day of the week, month, season, weather as categorical value (rainy, cloudy, sunny, snow), and average temperature of the season in the city.

Location features: other locations in a close radius of the location at interest, ratio of indoor structure (e.g. buildings) relative to outdoor structure (e.g. pedestrians areas, parks), ratio of internal versus external walls, construction material of indoor structures (e.g. glass, concrete).

City related features: population of the city, area of the city, number of distinct users in the city across the whole time period and monthly, coverage of unique users in the city (visitors/population), and such.

In some examples, the above features can be obtained directly from the obtained visitation data. In some other examples, the features can be generated based on the obtained visitation data and/or data pertaining to the location for which estimation footfall is desired. Below is a specific example of the spreadness of visits feature, which can be generated from the obtained visitation data and the given location.

Calculating Spreadness of Visits Algorithm

Let $N_{grid}$ be the number of squares that constitutes the grid of a polygon of a given location. $P_{total}$ is the total number of visits in the location.

Spreadness can be calculated by the mean of the absolute difference between the actual number of visits in the square and the ideal number of visits in each square if it would be evenly spread across the polygon.

The error is defined as the amount of 'distortion' relative to the perfect spread of visits. So for each square:

$$error_i = \min\left(\frac{P_{total}}{N_{grid}}, \left|P_i - \frac{P_{total}}{N_{grid}}\right|\right)$$

Then the Spreadness can be defined as:

$$spreadness = 1 - \frac{\sum_i error_i}{P_{total}}$$

Where $P_i$ is the number of visits in the square i which intersects with the polygon of the location. Low spreadness indicates that the visits are mainly concentrated in a few squares. High spreadness which is close to '1' means the spreadness is close to a perfect spread of visits.

It should be noted that the above features are for illustration only. A person versed in the art would consider other or additional features to be a part of the presently disclosed subject matter.

One type of possible features to be used by the ML models in the set of features are characterizing features. In some examples, a location can be predefined with one or more characterizing features. The characterizing features can be structural features, geographical features, or demographic features. The characterizing features can pertain to the location or the surroundings' location, and can be stored in integrated Location data 210.

The characterizing features of the location, or the location's surroundings, may affect the footfall estimation of a given location. For example, the number of signals received in a crowded area may be lower compared to less central areas, due to signal reception problems in crowded areas. If the given location is characterized as a crowded area, then this characterizing feature should be considered when estimating the footfall. Hence, it is advisable to use characterizing features relating to a location or a location's surrounding in the set of features of the ML model.

Following are some non-limiting examples of characterizing features: location (country, city, placement in the city (city center, residential area, suburbs)), structure (area/size of location, number of floors, indoors/outdoors size ratio), purpose of the property (retail/office/residential/agricultural/industrial/mixed), visitors features (age, gender, socio economic level, travel patterns, shopping interests), visits (returning/new, duration, seasonality (daily/weekly/yearly), trend), apps (purpose, popularity, usage patterns), heat map, and the distribution of the signaling within the location (e.g. spread out, dense, mainly indoor/outdoor), surroundings (e.g. how much of the X meter radius is pedestrian areas, roads, parks, stores, offices, recreation, features relating to visits/visitors statistics for the surrounding locations), and timing/weather (holidays, yearly season, temperature). In some examples, certain ML models were trained on data obtained from a specific location, and were evaluated with a high accuracy level. This means that their accuracy performance with respect to the specific location was determined to be high. In such cases, it is advisable to select the trained ML model for the specific location. Hence, a characterizing feature of a location can include a specification of an exact location, e.g. "City of Berlin" or "Beverly Center in L.A.". It should be noted that the above characterizing features are for illustration only. A person versed in the art would consider other features to be a part of the presently disclosed subject matter.

Returning now to the process of FIG. 4, as described above, once the ML models are provided, in some cases, determining footfall module 370 can select a ML estimation model of the plurality of ML estimation models, according to at least one feature of the operated set of features (block 480), and use the selected model for determining the footfall estimation for one or more locations (block 490). In some examples, more than one ML can be selected from the ML models, and can be used.

Selecting an ML model is according to at least one feature of the set of features operated by the ML model. In order to select a ML model, determining footfall module 370 may form a feature vector from the obtained visitation data to be input into the ML model. The feature vector includes one or more features.

For example, the feature vector can include the following features obtained or generated based on the visitation data:

1. number of distinct users seen in the location

-continued 2. number of visits in the location
3. spreadness estimation

In some examples, in addition, the feature vector can include features from additional data sources, e.g. from integrated Location data 210 and/or from integrated Visitor data 220. Hence, the above feature vector can include, in addition, the following features:

4. average temperature of the season in the city (obtained from location data 210)
5. returning users (obtained from integrated Visitor data 220 including profiling of users)

Yet, alternatively or additionally, the feature vector can include one or more characterizing features. Characterizing features relating to the location or the location's surroundings for which footfall estimation is to be determined, can be obtained, e.g. from integrated Location data 210. Hence, the above feature vector can also include the following characterizing features:

6. size of location
7. exact location

Any combination of the above exemplified features can be used to form the input feature vector.

In some examples, in order to determine a footfall estimation, one or more ML models, each operating on a set of features, is identified. The identification of the ML models can be done based correspondence between features included in the set of features of the ML models, and features included in the generated feature vector from the visitation data. In such examples, the features in the generated feature vector, and the set of features operated by the ML model are considered to correspond each other, if at least one feature in the generated feature vector is identical or derived from at least one feature in a set of features operated by a ML model. Referring to the above example, the feature vector, generated based on visitation data, includes 7 features (number of distinct users seen in the location, number of visits in the location, spreadness estimation, average temperature of the season in the city, returning users, size of location and exact location). A corresponding set of features of one or more ML models would be a set of features comprising one or more of the above 7 features. Accordingly, one or more ML models may be identified if their respective set of features correspond and include one or more of the above 7 features. In some examples, all available ML models include a corresponding set of features, and can be identified.

Once the input feature vector is generated, and one or more ML models having a corresponding set of features are identified, the values of the features are estimated or calculated, if possible, based on the obtained data, in order to select a ML model from among those ML models which have been identified, which best performs with respect to the values of the formed input feature vector. For example, the value of the feature of the number of distinct users seen in the location can be calculated based on the number of distinct IDs of users in the visitation data. The value of number of visits in the location can be calculated based on the number of clusters of visits generated from the visitation data. The value of returning users can be obtained e.g. from stored visitation data.

For example, the following values can be evaluated with respect to the above features:

| Feature | Value |
|---|---|
| 1. number of distinct users seen in the location | 1,000 |
| 2. number of visits in the location | 10,000 |
| 3. spreadness estimation | 0.4 |
| 4. average temperature of the season in the city | 24° |
| 5. returning users | 45% |
| 6. size of location | 5000 Sq Meters |
| 7. exact location | "City of Berlin" |

In some examples, one or more features in the feature vector can be generated for each entity in the geo-hierarchy, e.g. per country, region, city, postal code or per location, while other features can be generated only for some entities in the geo-hierarchy, e.g. only for country. For example, the total number of distinct users feature may be relevant to all entities, whereas the population feature may be relevant only to country and city entities, and not for location.

Once the feature vector with the respective values is formed, a ML estimation model, from the ML models, is selected, according to at least one feature of the operated set of features. As will be explained with reference to FIG. 6, during the training stage the accuracy level (also to be referred to as error rate) of each ML model can be measured. The error rate can represent the difference between the estimated footfall of the ML model for a location, compared to the real footfall of the location. Based on the error rate, a performance score can be associated with each ML model. The lower the error rate (higher accuracy level), the higher the performance score. The error rate and the performance score are determined, during the training stage, based on at least a particular set of features operated by the ML model, and can be associated and stored with each ML model. The accuracy level and performance score can be stored e.g. in Models 332. The process of determining the accuracy level (error rate) and performance score for a ML model, and associating them with the ML model, is further described below with respect to FIG. 7 illustrating the training process.

Hence, during the inference stage, in order to select a ML model, determining footfall module 370 can determine which of the ML models best performs with respect to the values of the input feature vector. For example, determining footfall module 370 can retrieve one or more ML models from models 332, which operate a set of features which corresponds to the generated feature vector, i.e. that at least one feature included in the generated feature vector is identical or derived from at least one feature in a set of features operated by a ML model. Then, from the retrieved ML models, determining footfall module 370 can select the ML model having the highest performance score for that feature set. In some examples, more than one ML model can be selected.

The selected ML model can be used, with the obtained data, for determining the footfall estimation for a location.

In some examples, each ML model can be associated with a weight. The weight is related to a set of features and can be calculated based on the error rate. For example, if the error rate is high, meaning the performance score of the ML model operating a given set of features is low, then the weight that is given to this ML model with that given set of features will also be low. The ML model can be selected and used with the associated weight. For example, the output of the ML model can be multiplied by the weight given to the ML model to obtain a weighted output which is indicative of the output of the ML model considering its error rate.

In some examples, more than one ML model is selected and used for determining the estimation. In such examples, the outputs of each selected ML model can be aggregated to provide a single output of footfall estimation, e.g. using the average of all outputs. If the ML models are associated with weights, their output can be aggregated in a weighted manner, using known per se methods, to provide a single output. The weight can also be stored, along with the set of features, in models 332.

Figure 6:
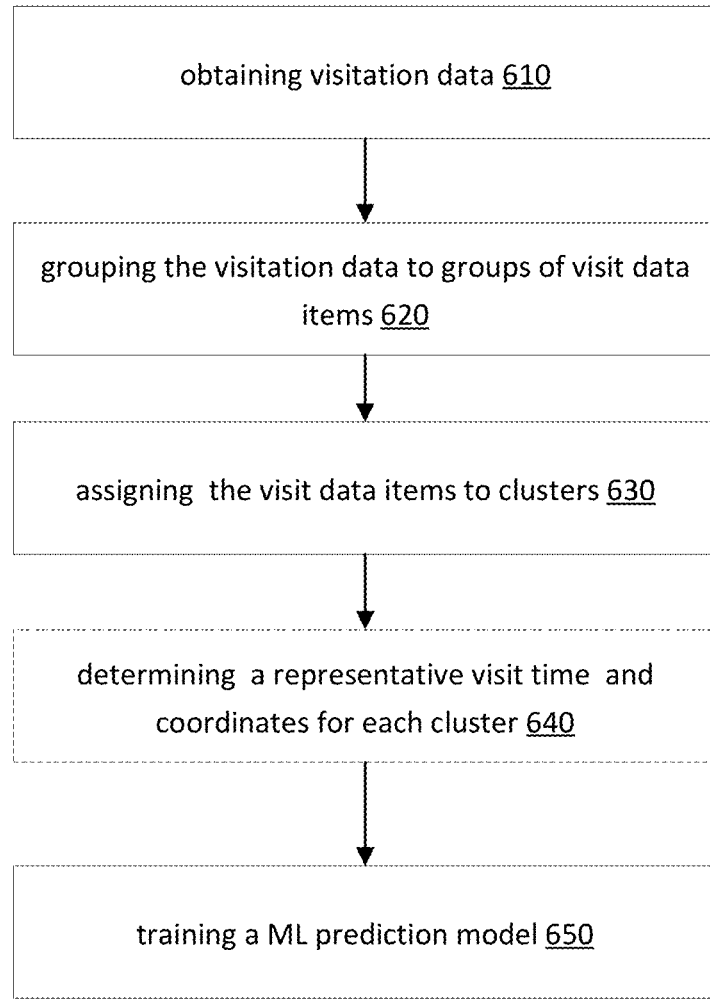
FIG. 6 illustrates a generalized flowchart of the training process of a ML model, in accordance with certain embodiments of the presently disclosed subject matter.

Reference is being made to FIG. 6 illustrating a general flowchart of the training process of a ML model, in accordance with certain embodiments of the presently disclosed subject matter.

The description above with relation to blocks 410-450 of FIG. 4 is also relevant for blocks 610 to 640 of FIG. 6, with reference to the modules comprised in processor 320. As such, obtaining data module 340 can obtain visitation data, where the visitation data is training visitation data. For each training visitation data there is a given footfall estimation for a location. Accordingly, in some cases, training visitation data is obtained, where the training visitation data includes a plurality of visit data items, wherein each visit data item includes at least data indicative of visit time and visit coordinates associated with a user (block 610). In some examples, the obtained visitation data can be pre-processed in a similar manner to that described with respect to block 420. The obtained training visitation data is then grouped into one or more groups of visit data items, wherein each group is associated with a respective user (block 620). For each group, the data items in the group are assigned to one or more clusters of visits data, including, for each data item, assigning the data item to a given cluster of the clusters, if at least the visit time data and the visit coordinates data of the data item comply with corresponding visit time and visit coordinates conditions that are associated with the given cluster (block 630). In some examples, the process then proceeds to determine representative visit time data and representative visit coordinates data for each one of the clusters of visits, based on the visit time data and visit coordinate data of the data items in the respective cluster (block 640).

Once the data items are assigned to the clusters of visits, a machine learning (ML) estimation model, having a specified set of features, is trained, to estimate footfall for a given location, based on one or more clusters of visits data. The footfall estimation is indicative of a number of visits of one or more users in the location within one or more time intervals (block 650). Training the ML model can be done by comparing the output of the ML model to a known footfall count for the location.

In some cases, in order to train a ML model, one or more instances of known per se ML models are selected, where each instance can be of a different type (e.g. XGBoost, Random Forest, Deep Learning networks). Each ML model can have different settings and/or different configuration. In order to test a ML model, one or more features can be selected from a predefined list of features to form a set of features to train the ML model. For example, the predefined list of features can include any of the exemplary features and characterising features detailed above. In some examples, a features set can include one or more features relating to clusters of visits. For example, a feature relating to a cluster of visits can be the number of visits in the location. As explained above, including a feature relating to the clusters of visits in the set of features assists in training the ML model in a more accurate manner, despite any inconsistency in usage patterns that exists in visitation data.

The ML model, with the selected set of features can then be trained, based on the training visitation data including the one or more clusters of visits data, to estimate footfall for a given location. The ML model can be trained based on a known footfall count for a location. In some examples, the accuracy performance can be measured with respect to the set of features.

As known in the art, during training stage, the ML models are continuously trained and tested in various regions/locations, and their performance is measured, to determine an error rate for a set of features, using known per se error algorithms. In some examples, the error algorithms, can, in addition to using known per se methods, execute a revised error rate method. In known methods, the real number of footfalls is always divided with the known number. In such a manner, the metric is not symmetric—i.e. since a different result is obtained when the estimated footfall figure is higher than the known footfall figure vs. the opposite situation. The revised error rate method includes dividing the higher number with the lower number. In such a manner, the metric stays symmetric—i.e. the result will be the same in both directions—e.g. estimated footfall figure=X>Y=known footfall figure vs estimated footfall figure=Y<X=known footfall figure.

Based on the accuracy performance of each ML model, and the error rate with respect to a set of features, the ML model can be associated with a performance score. The performance score is indicative of the accuracy level in estimating a footfall by the ML model, with respect to the operated set of features.

In addition, during training, each ML model can be associated with a respective weight to be used in the inference stage. The weight is related to a set of features and can be calculated based on the error rate (accuracy level) based on known footfall count of the location. For example, if the error rate is high, and performance score of the ML model for the set of features is low, then the weight that is given to this ML model with that set of features, will also be low. During the inference stage, the ML model can be selected and used with the associated weight. In some examples, during the inference stage, more than one ML model is selected and used for determining the footfall estimation. In such examples, the outputs of each selected ML model can be aggregated to provide a single output of footfall estimation, e.g. using the average of all outputs. If the ML models are associated with weights, their output can be aggregated in a weighted manner to provide a single output. As described above, the trained ML models, with one or more sets of features for each ML model, along with the performance score, the weight and accuracy level, can be stored in models 332 in memory 330.

It is noted that the teachings of the presently disclosed subject matter are not bound by the flow charts illustrated in FIGS. 4 and 6. The illustrated operations can occur out of the illustrated order. For example, operations 420, 430, 440 and 450, and operations 620, 630 and 640, shown in succession, can be executed substantially concurrently, or in the reverse order with respect to different users and different clusters. It is also noted that whilst the flow chart is described with reference to elements of footfall estimation system 300, this is by no means binding, and the operations can be performed by elements other than those described herein.

It is to be understood that the invention is not limited in its application to the details set forth in the description contained herein or illustrated in the drawings. The invention is capable of other embodiments and of being practised and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method for estimating footfall for a location of one or more users, by a processor and memory circuitry (PMC), the computerized method comprising:
   a) obtaining visitation data including a plurality of visit data items, wherein each visit data item includes at least data indicative of visit time and visit coordinates associated with a user of the one or more users;
   b) grouping the obtained visitation data into one or more groups of visit data items, wherein each group is associated with a respective user;
   c) for each group, assigning the data items in the group to one or more clusters of visits, including, for each visit data item:
      assigning the data item to a given cluster of the clusters, if at least the visit time data and the visit coordinates data of the data item comply with corresponding visit time and visit coordinates conditions that are associated with the given cluster, wherein assigning the data item to the given cluster of the clusters comprises determining that the difference between the visit time of the data item and at least one visit time that is associated with the given cluster, does not exceed a time threshold, and that the distance between the visit coordinates of the data item and at least one visit coordinates associated with the given cluster, does not exceed a distance threshold; and
   d) determining, based on the one or more clusters of visits data, a footfall estimation for a location, wherein the footfall estimation for the location is indicative of a number of visits of the one or more users in the location, within one or more time intervals.

2. The computerized method of claim 1, wherein at least one cluster of the one or more clusters of visits includes at least two data items.

3. The computerized method of claim 1, wherein obtaining visitation data comprises pre-processing the visitation data, using at least one of:
   normalizing one or more of the visit data items to a predefined unified form;

extracting one or more anomalous visit data items; or
updating one or more of the visit data items to include additional data pertaining to the visitation data.

4. The computerized method of claim 1, wherein the data indicative of visit coordinates included in each item includes data on geographical coordinates obtained from one or more mobile devices.

5. The computerized method of claim 1, wherein determining that the difference between the visit time of the data item and the at least one visit time that is associated with the given cluster, does not exceed the time threshold, including determining that visit time of the data item and a visit time of one or more of data items already assigned to the give cluster, do not exceed the time threshold.

6. The computerized method of claim 1, wherein determining that the distance between the visit coordinates of the data item and the visit coordinates that are associated with the given cluster, do not exceed the coordinates threshold, including determining that visit coordinates of the data item and visit coordinates of one or more data items already assigned to the give cluster, do not exceed the distance threshold.

7. The computerized method of claim 1, wherein determining the footfall estimation comprises:
providing a plurality of ML estimation models, wherein each of the ML estimation models are trained to estimate footfall of a location while operating on a set of features, wherein at least one feature of the set of features is a feature relating to a cluster of visits;
selecting at least one machine learning (ML) estimation model of the plurality of ML estimation models, according to at least one feature of the operated set of features; and
using the selected ML estimation model for determining the footfall estimation for one or more locations.

8. The computerized method of claim 7, wherein at least one additional feature of the set of features is selected from a group comprising: a location characterizing feature, a location's surroundings characterizing feature, location's visits characterizing feature, location's visitors characterizing feature, or a combination thereof.

9. The computerized method of claim 7, wherein the at least one feature of the set of features is selected from at least one of spreadness of visits in the location, or data relating to profiles of visitors.

10. The computerized method of claim 7, wherein the method further comprises:
c1) determining representative visit time data and representative visit coordinates data for each one of the clusters of visits based on the visit time data and visit coordinate data of the data items in the respective cluster; and
d) determining the footfall estimation for one or more locations;
wherein at least one feature of the set of features relates to the determined representative visit time data or the determined representative visit coordinates data.

11. The computerized method of claim 7, wherein selecting the at least one ML estimation model further comprises:
retrieving a respective model weight for each of the selected at least one ML estimation model, wherein a model weight is calculated based on accuracy level of the ML model, as determined during training of the ML model, with respect to the set of features operated by the ML model; and
using the at least one selected ML estimation model with the respective retrieved model weight.

12. The computerized method of claim 1, wherein at least one of the locations has a shape of a polygon predefined using geographical coordinates.

13. The computerized method of claim 1, wherein at least one of the locations has a shape of a circular area predefined by a center of the circular area.

14. The computerized method of claim 1, further comprising:
c1) associating one or more clusters of visits with a respective visits weight based on data that pertains to the clusters of visits and/or additional data that pertains to the at least one user; and
d) determining the footfall estimation, based on the clusters of visits data and the associated respective visits weight.

15. A system for estimating footfall for a location of one or more users, by a processor and memory circuitry (PMC), the processor being configured to:
a) obtain visitation data including a plurality of visit data items, wherein each visit data item includes at least data indicative of visit time and visit coordinates associated with a user of the one or more users;
b) group the obtained visitation data into one or more groups of visit data items, wherein each group is associated with a respective user;
c) for each group, assign the data items in the group to one or more clusters of visits, including, for each visit data item:
assign the data item to a given cluster of the clusters if at least the visit time data and the visit coordinates data of the data item comply with a corresponding visit time and visit coordinates conditions that are associated with the given cluster, wherein assigning the data item to the given cluster of the clusters comprises determining that the difference between the visit time of the data item and at least one visit time that is associated with the given cluster, does not exceed a time threshold, and that the distance between the visit coordinates of the data item and at least one visit coordinates associated with the given cluster, does not exceed a distance threshold; and
d) determine, based on the one or more clusters of visits data, a footfall estimation for a location, wherein the footfall estimation for the location is indicative of a number of visits of the one or more users in the location within one or more time intervals.

16. A non-transitory computer readable storage medium tangibly embodying a program of instructions that, when executed by a computer, cause the computer to perform a method for estimating a footfall for a location of one or more users, by a processor and memory circuitry (PMC), the method comprising:
a) obtaining visitation data including a plurality of visit data items, wherein each visit data item includes at least data indicative of visit time and visit coordinates associated with a user of the one or more users;
b) grouping the obtained visitation data into one or more groups of visit data items, wherein each group is associated with a respective user;
c) for each group, assigning the data items in the group to one or more clusters of visits, including, for each visit data item:
assigning the data item to a given cluster of the clusters, if at least the visit time data and the visit coordinates data of the data item comply with corresponding visit time and visit coordinates conditions that are associated with the given cluster, wherein assigning the data item to the given cluster of the clusters comprises determining that the difference between the visit time of the data item and at least one visit time that is associated with the given cluster, does not exceed a time threshold, and that the distance between the visit coordinates of the data item and at least one visit coordinates associated with the given cluster, does not exceed a distance threshold; and d) determining, based on one or more clusters of visits data, a footfall estimation of a location, wherein the footfall estimation for the location is indicative of a number of visits of the one or more users in the one or more locations in one or more time intervals.

17. A computerized method for training a machine learning (ML) estimation model to estimate footfall for a location, by a processor and memory circuitry (PMC), the computerized method comprising:

a) obtaining training visitation data including a plurality of visit data items, wherein each visit data item includes at least data indicative of visit time and visit coordinates associated with a user;

b) grouping the obtained training visitation data into one or more groups of visit data items, wherein each group is associated with a respective user;

c) for each group, assigning the data items in the group to one or more clusters of visits data, including, for each data item:
   assigning the data item to a given cluster of the clusters if at least the visit time data and the visit coordinates data of the data item comply with corresponding visit time and visit coordinates conditions that are associated with the given cluster; and d) training a machine learning (ML) estimation model having a specified set of features, based on one or more clusters of visits data, to estimate footfall for a given location, wherein the footfall estimation is indicative of a number of visits of one or more users in the location within one or more time intervals;

e) determining a model weight, wherein a model weight is calculated based on accuracy level of the ML model based on known footfall count of the location; and f) associating the determined model weight with the ML estimation model.

18. A system for estimating footfall for training a machine learning (ML) estimation model to estimate footfall for a location, by a processor and memory circuitry (PMC), the processor configured to execute a method comprising:

a) obtaining training visitation data including a plurality of visit data items, wherein each visit data item includes at least data indicative of visit time and visit coordinates associated with a user;

b) grouping the obtained training visitation data into one or more groups of visit data items, wherein each group is associated with a respective user;

c) for each group, assigning the data items in the group to one or more clusters of visits data, including, for each data item:
   assigning the data item to a given cluster of the clusters if at least the visit time data and the visit coordinates data of the data item comply with corresponding visit time and visit coordinates conditions that are associated with the given cluster, d) training a machine learning (ML) estimation model having a specified set of features, based on one or more clusters of visits data, to estimate footfall for a given location, wherein the footfall estimation is indicative of a number of visits of one or more users in the location within one or more time intervals;

e) determining a model weight, wherein a model weight is calculated based on accuracy level of the ML model based on known footfall count of the location; and f) associating the determined model weight with the ML estimation model.

* * * * *